May 31, 1927.

B. D. LANDON 1,630,950

TRACTOR WHEEL ATTACHMENT

Filed June 23, 1926

WITNESSES

INVENTOR
B. D. Landon.
BY
ATTORNEYS

Patented May 31, 1927.

1,630,950

UNITED STATES PATENT OFFICE.

BENJAMIN DEAN LANDON, OF CANTON, PENNSYLVANIA.

TRACTOR-WHEEL ATTACHMENT.

Application filed June 23, 1926. Serial No. 118,091.

The present invention is concerned with the provision of means for automatically effecting removal of the stones and dirt which tend to collect within the channel steel rim of a tractor wheel. Ordinarily pebbles and dirt and often times larger stones will work their way between the two channel flanges of a tractor wheel rim, and will bounce and rattle around inside of the rim, making a great deal of noise and causing considerable inconvenience. Heretofore no means has been provided for removing these pebbles and dirt, and it is often times awkward to remove them by hand, not to mention the inconvenience of frequently stopping the tractor to clean out the wheels.

Most of the lumps or clods of dirt which are trapped in the tractor wheel are part of the dry top soil over which the tractor is working. These lumps knocking against the rivet heads in the wheel and pounding against the loose stones which may also be entrapped are rapidly powdered to a fine dust which blows over the tractor and the operator, and makes the job of operating the tractor an extremely dirty one.

In accordance with the present invention, I provide a tractor wheel attachment in the nature of a stone and dirt ejector carried by the inner face of the rim which acts to automatically discharge stones and dirt at each revolution of the wheel.

The device is in the nature of a trap in which the stones and dirt are gathered, and from which they are gravitationally ejected at each revolution of the wheel.

Objects of the invention are to provide an attachment of this character of simple, practical construction, which will be rugged, durable and efficient in use, which may be manufactured with comparative economy, and which may be readily applied to an ordinary tractor wheel.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
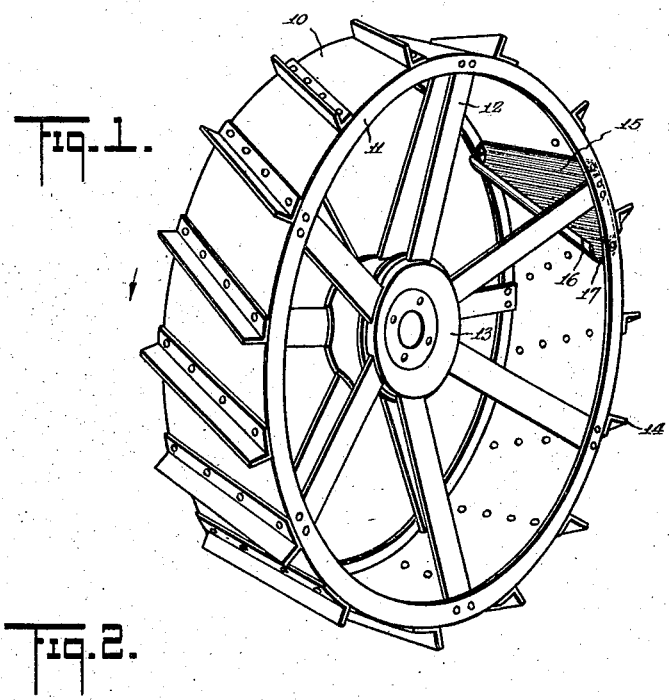
Fig. 1 is a perspective view of a tractor wheel showing my attachment in operative position thereon.
Figure 2:
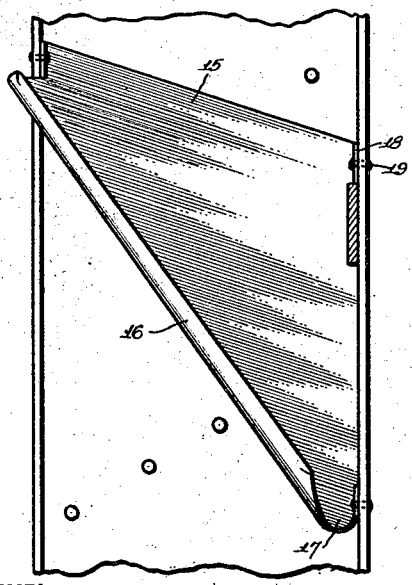
Fig. 2 is an enlarged detail view looking at the inner face of the tractor rim, and illustrating the manner in which the trough or chute is inclined.
Figure 3:
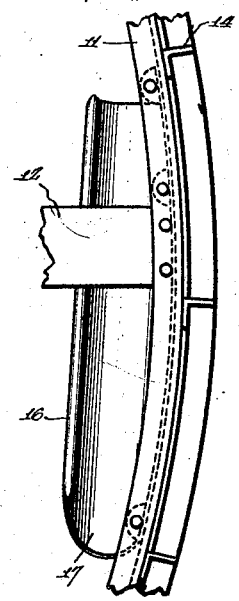
Fig. 3 is an enlarged fragmentary detail view looking at the edge of the tractor rim.

In the drawings I have shown a tractor wheel such as is commonly employed on Ford tractors, this wheel comprising a relatively wide flat rim 10 provided with the usual inwardly turned channel forming flanges 11. Flanges 11 are connected by spokes 12 to the wheel hub 13, and the outer face of the rim is provided with the customary ground gripping cleats 14 at spaced intervals.

As the tractor moves over soft plowed ground, dirt and pebbles enter the interior of the wheel, and the flanges 11 trap them in the wheel, so that they will continue to rattle and bounce around while the tractor is in operation. I overcome this difficulty by the provision of the unique attachment illustrated, which consists of a plate-like member 15 secured to the inner face of the rim 10, and formed with the upwardly curved follower edge 16 defining a trough or chute 17. Ears 18 on the corners of the plate 15 may be riveted or otherwise secured at 19 to the flanges 11, and the trough 16 is disposed diagonally of the transverse plane of the rim. Thus, if the wheel is moving in the direction of the arrow, in Fig. 1, the stones and dirt which may collect in the bottom of the wheel will be gathered into the trough 16 as the trough reaches its lowermost position. When the trough has reached the position of Fig. 1, the chute 17 will be in a position to effect gravitational discharge of the stones and dirt to a point laterally of the wheel. Obviously the troughs or attachments for the right and left hand shoe will be oppositely facing, so that they will both discharge to the side of the tractor.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A tractor wheel attachment including a plate adapted to be secured to the inner face of a tractor rim and including a trough shaped portion disposed at an angle to the transverse axis of the rim for gravitationally ejecting stones and other material from the inside of the rim.

2. The combination with a solid unapertured channelled wheel rim, of a curved transversely disposed ejector plate secured to the inner face thereof for removing loose pebbles from the interior of the rim.

3. The combination with a channelled wheel rim, of an ejector plate secured to the inner face thereof for removing loose pebbles from the interior of the rim, said plate including an inclined trough shaped portion acting as a discharge chute.

BENJAMIN DEAN LANDON.